US007528999B2

(12) United States Patent
Sawada et al.

(10) Patent No.: US 7,528,999 B2
(45) Date of Patent: May 5, 2009

(54) IMAGE FORMING APPARATUS

(75) Inventors: Hirohisa Sawada, Chiba-ken (JP);
Kazuhiko Hasegawa, Chiba-ken (JP);
Yoshiyuki Nakayama, Ibaraki-ken (JP);
Tatsuyuki Yamamoto, Ibaraki-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 741 days.

(21) Appl. No.: 10/958,384

(22) Filed: Oct. 6, 2004

(65) Prior Publication Data
US 2005/0078341 A1      Apr. 14, 2005

(30) Foreign Application Priority Data
Oct. 8, 2003      (JP)      ............... 2003-349735

(51) Int. Cl.
*H04N 1/04*      (2006.01)
(52) U.S. Cl. ................ 358/474; 358/471; 358/475; 358/400
(58) Field of Classification Search ............... 358/474, 358/471, 400, 475; 399/31, 9, 183, 182, 399/177, 130; 347/5, 1
See application file for complete search history.

(56) References Cited

U.S. PATENT DOCUMENTS

| 4,752,809 | A | * | 6/1988 | Ito ............................ 399/183 |
| 5,812,154 | A | * | 9/1998 | Kuboki ......................... 347/5 |
| 6,606,171 | B1 | * | 8/2003 | Renk et al. .................. 358/475 |
| 2003/0095300 | A1 | | 5/2003 | Nakatani et al. ............ 358/523 |

FOREIGN PATENT DOCUMENTS

JP          5-127443          5/1993

* cited by examiner

*Primary Examiner*—Houshang Safaipour
(74) *Attorney, Agent, or Firm*—Fitzpatrick, Cella, Harper & Scinto

(57) ABSTRACT

The preset invention relates to an image forming apparatus comprising; an original loading member on which an original is loaded, image reading means for scanning the loaded original to read image information, recording material conveying unit which conveys a recording material in a direction substantially orthogonal to a direction in which the image reading means reads the image information, image forming means for forming an image on the conveyed recording material and an image forming electric board which is arranged in a space on a side of a lengthwise direction of said original relative to said recording material conveying unit.

5 Claims, 4 Drawing Sheets

IMAGE FORMING APPARATUS

BACKGROUND OF THE INVENTION (a) Field of the Invention

The present invention relates to an image forming apparatus such as a copying machine and a facsimile, in which an image reading unit and an image recording unit main body are provided.

(b) Description of the Related Art

A multifunction peripheral such as a copying machine and a facsimile, in which the image reading unit and the image recording unit main body are provided, will be described as an example of the conventional image forming apparatus. A configuration of the conventional multifunction peripheral is shown below. A paper feed unit which feeds a recording material loaded in a cassette, an image forming unit which forms the image with a laser printer, a fixing device which fixes the image onto the recording material, and a discharge unit which discharges the recording material to the outside of the apparatus to stack the recording material are provided in a lower portion (image recording unit main body) of the image forming apparatus.

A flat-bed scanner which is of original reading means is provided in an upper portion (image reading unit) of the apparatus. The flat-bed scanner reads the image of an original loaded on a surface of an original plate by scanning a reading unit. An original conveying unit is provided in an end portion of the flat-bed scanner. The original conveying unit separates the plurality of originals set on a tray and reads the original while conveying the original.

Recently, in single-function printer products, a layout in which paper feed and conveying directions of the recording material becomes a depth direction of the apparatus is the mainstream. In the multifunction peripheral, the layout in which the paper feed and conveying directions of the recording material becomes the depth direction of the apparatus in the image recording unit main body of and the scanning direction of the original becomes a width direction of the apparatus (lateral direction) in the flat-bed scanner has been proposed as disclosed in Japanese Patent Application Laid-Open No. 5-127443. That is, the multifunction peripheral is configured so that the paper feed and conveying directions of the recording material is orthogonal to the scanning direction of the original.

However, in the configuration of the image forming apparatus disclosed in Japanese Patent Application Laid-Open No. 5-127443, in the image recording unit main body in which the paper feed and conveying directions of the recording material is set in the depth direction of the apparatus relative to a front face of an operation unit, the recording material is set in a paper feed cassette so that a lengthwise direction of the recording material becomes the depth direction of the apparatus. Therefore, in an installation size of the image recording unit main body, the depth direction of the apparatus is longer and the width direction of the apparatus (lateral direction) is shorter relative to the operation unit.

On the other hand, in the flat-bed scanner, because the scanning direction of the original becomes the lateral direction relative to the front face of the operation unit of the apparatus, the original is set so that the lengthwise direction of the original on the surface of the original plate becomes the lateral direction of the apparatus. Therefore, the installation size of the flat-bed scanner, the width direction of the apparatus (lateral direction) is longer and the depth direction of the apparatus is shorter relative to the operation unit.

As a result, in the width direction of the apparatus (lateral direction), there is a problem that space efficiency is bad and an installation space is enlarged, because the flat-bed scanner is wider than the image recording unit main body and both sides of a recording material conveying path though which the recording material of the image recording unit main body is conveyed becomes a dead space. A length of a scanning direction capable of scanning image information of the image reading means is longer than a length of the sheet conveyed in the scanning direction Further, in the conventional image forming apparatus, an electric board unit which controls the apparatus is provided forward of the side face of the apparatus. Therefore, there is the problem that the depth direction of the apparatus is expanded relative to the front face of the operation unit of the image recording unit main body.

SUMMARY OF THE INVENTION

It is an object of the invention to effectively utilize a margin space where the recording material is not conveyed in the lengthwise direction of the original in the configuration in which the lengthwise direction of the loaded original having the maximum size is orthogonal to the lengthwise direction of the conveyed recording material.

It is another object of the invention to decrease the width of the image forming apparatus in the direction orthogonal to the lengthwise direction of the loaded original having the maximum size.

It is still another object of the invention to provide an image forming apparatus comprising an original loading member on which an original is loaded, image reading means for scanning the loaded original to read image information, recording material conveying unit which conveys a recording material in a direction substantially orthogonal to a direction in which the image reading means reads the image information, image forming means for forming an image on the conveyed recording material, and an image forming electric board which is arranged in a space on a side of a lengthwise direction of the original relative to the recording material conveying unit.

Other objects of the invention will be apparent from the following description.

DETAILED DESCRIPTION OF THE PREFERRED EMBODIMENT

First Embodiment

Figure 1:
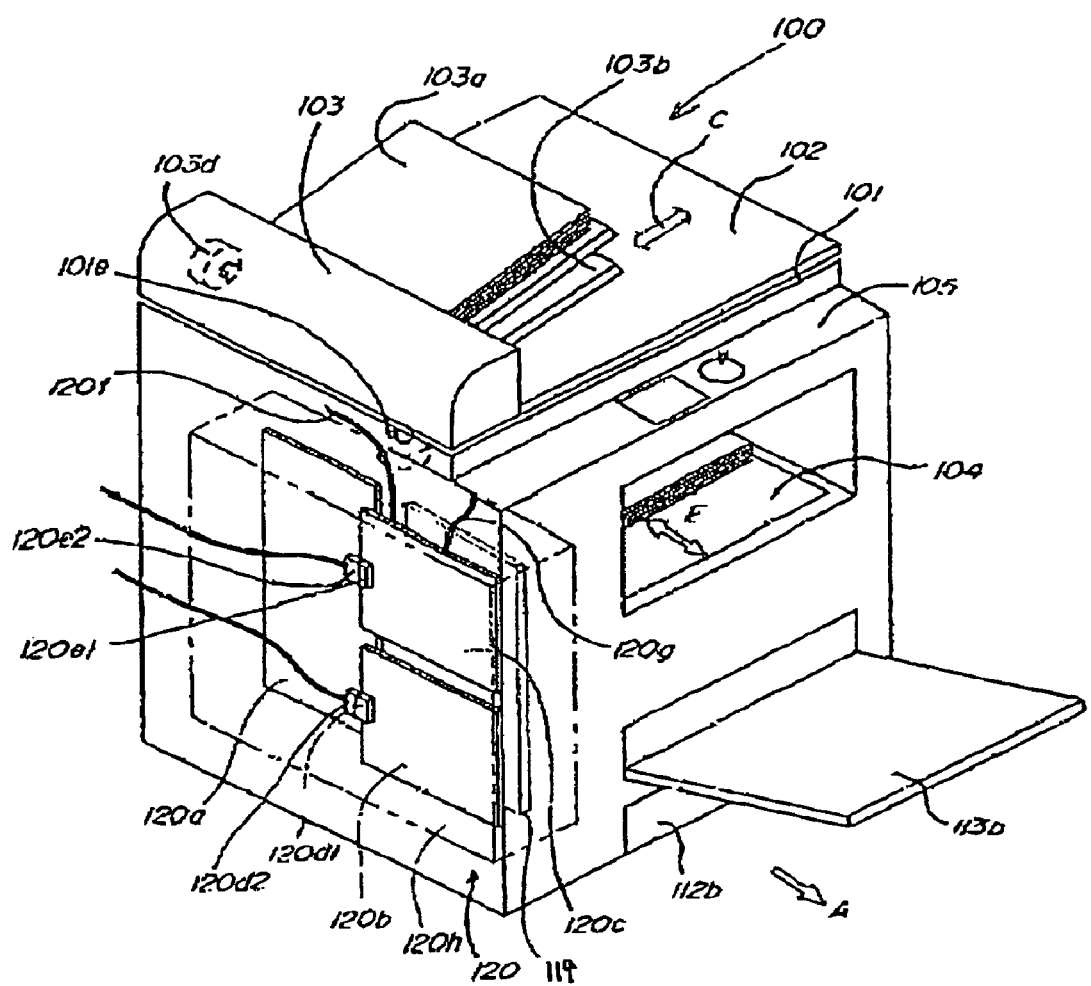
FIG. 1 is a perspective view of an image forming apparatus according to an embodiment.
Figure 2:
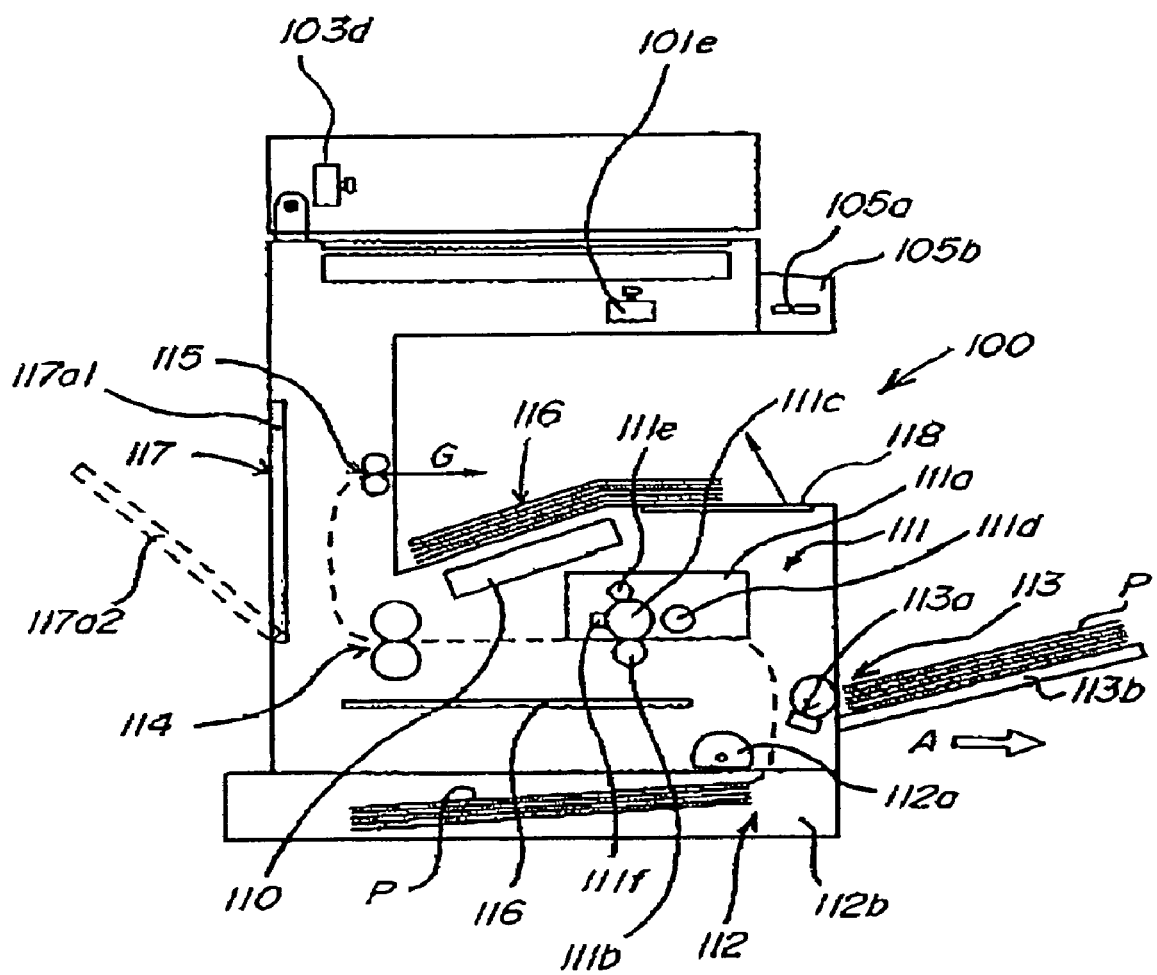
FIG. 2 is a sectional view of the image forming apparatus when viewed from a side face of the image forming apparatus.
Figure 3:
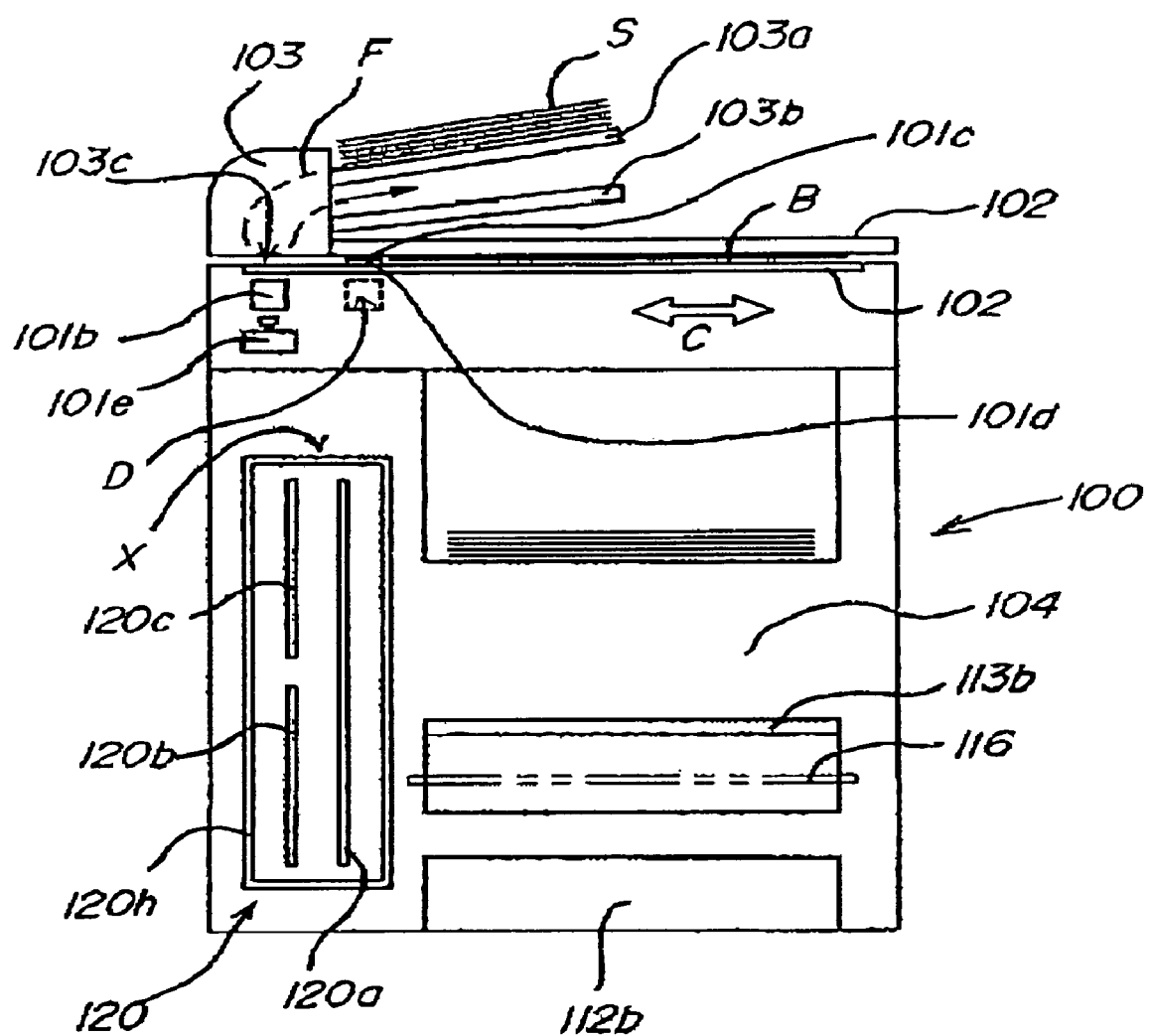
FIG. 3 is a sectional view of the image forming apparatus when viewed from the front of the image forming apparatus.
Figure 4:
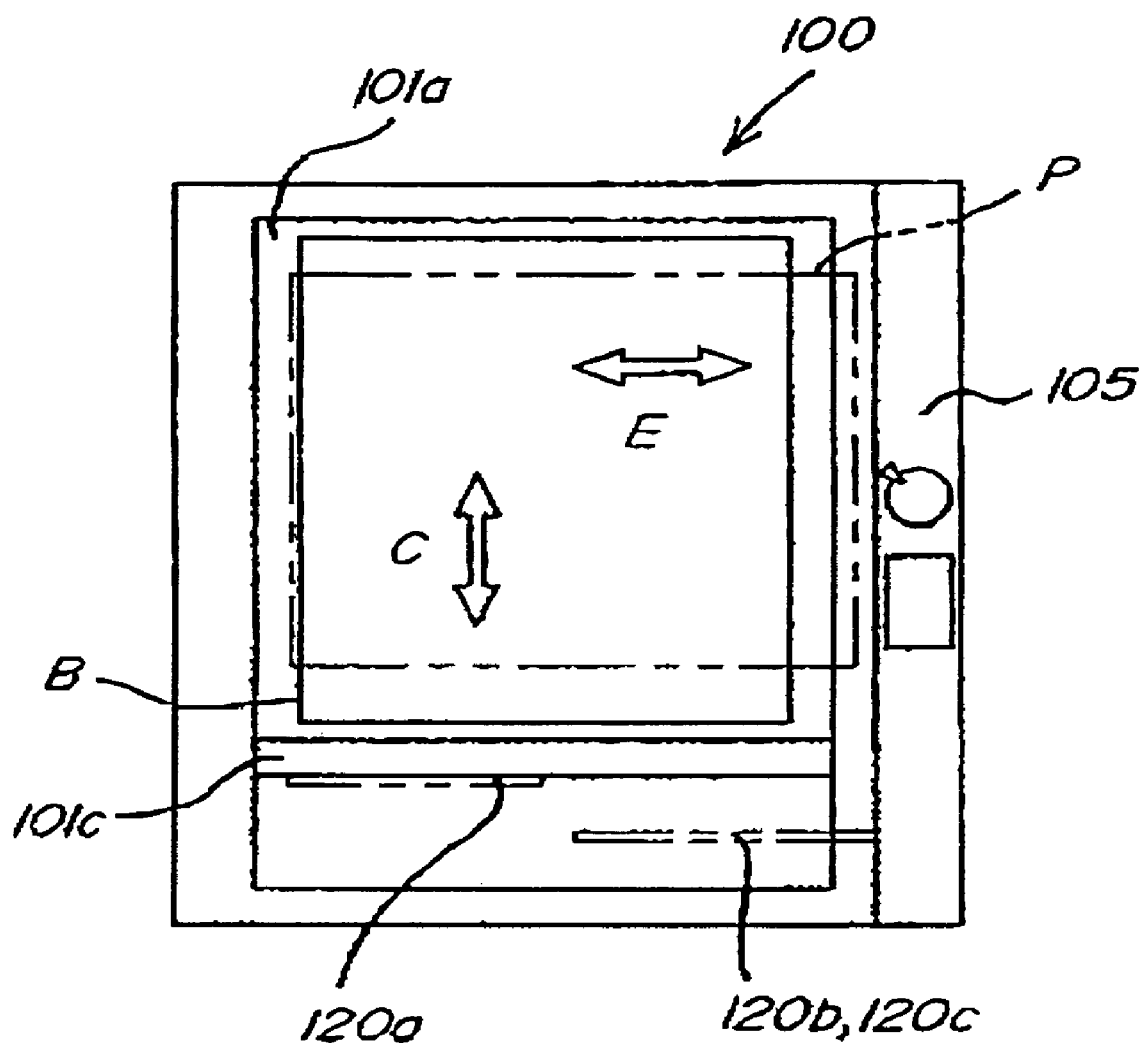
FIG. 4 is a top view of the image forming apparatus.

Referring to the accompanying drawings, a preferred embodiment according to the invention will be described. The multifunction peripheral (hereinafter referred to as MFP) combining a facsimile function, a printer function, and a copying function of reading the image of the original such as a book and a sheet to make a copy will be described as an example of the image forming apparatus according to the invention. FIG. 1 is a perspective view of an image forming apparatus according to the embodiment when viewed from a diagonally forward left of the image forming apparatus, and FIG. 1 also shows a detail of an arrangement of electric boards. FIG. 2 is a sectional view of the image forming apparatus when viewed from a left side of the image forming apparatus. FIG. 3 is a sectional view of the image forming apparatus when viewed from the front of the image forming apparatus. FIG. 4 is a top view of the image forming apparatus when a platen board which becomes an original cover is opened.

(Schematic Description of Overall Image Forming Apparatus)

Referring to FIGS. 1 to 4, the overall multifunction peripheral will be schematically described. As shown in FIGS. 1 to 4, the image forming apparatus includes an image recording unit main body 100 which is of the main body of the image forming unit, an image reading unit having a flat-bed scanner 101 which is of image reading means and an original conveying unit 103 which is of original conveying means, and an electric equipment unit 120 in which electric boards are arranged.

The image recording unit main body 100 includes a recording unit 104 having a laser beam printer, a cassette paper feed unit 112 recording material feed unit), a multi-paper feed unit 113 (recording material feed unit), a face-down discharge unit 115 (discharge unit), a face-down discharge tray 116, and a face-up discharge unit 117 (discharge unit). The recording unit 104 includes an image forming unit 111, a fixing unit 114, and an operation unit 105.

The flat-bed scanner 101 reads an original B loaded on a surface of an original plate glass 101a (surface of original plate) by scanning an original B in a width direction of the apparatus (horizontal direction; direction of arrow C). The original plate glass 101a is of a first original loading member. A platen board 102 can be opened and closed in a vertical direction and press the original B placed on the original plate glass 101a. A contact type image sensor 101b is used as a reading sensor which is of an example of the reading means.

The original conveying unit 103 which is of the original conveying means conveys an original S loaded on an original loading tray 103a in the direction of an arrow F in FIG. 3 while separating the original S one by one. The original loading tray 103a is of a second original loading member. A sheet reading unit 103c reads the original S while the original conveying unit 103 conveys the original S to the sheet reading unit 103c (original reading position). After the sheet reading unit 103c reads the original S, the original S is discharged to an original discharge tray 103b to stack the originals. In the embodiment, the original loading member has the configuration in which both the original plate glass 101a and the original loading tray 103a in the original conveying unit 103 are provided. Needless to say, it is also possible that the original loading member has the configuration in which either the original plate glass or the original loading tray is provided.

The image forming unit 111 includes a toner cartridge 111a. The toner cartridge 111a is formed in an integral container inside which a photosensitive drum 111c which is of an image bearing body, a charging unit 111e, a development unit 111d, a cleaning unit f, and toner are stored. At this point, the toner is transferred onto a recording material P while the recording material P is conveyed between the photosensitive drum 111c and a transfer roller 111b which is of a transfer member.

The cassette paper feed unit 112 is an example of the recording material feed unit, and the recording material P is stored in the cassette paper feed unit 112. A paper feed roller 112a separates one sheet of the recording material P from the cassette paper feed unit 112 to convey the sheet of the recording material P to the image forming unit 111. In the multi-paper feed unit 113 which is an example of the recording material feed unit, the recording materials P stacked on a multi-tray 113b is separated one by one by a multi-separation unit 113a including the paper feed roller 112a and a separation strip to convey the sheet of the recording material P to the image forming unit 111.

The fixing deice 114 is an example of fixing means. The toner transferred onto the recording material P in the image forming unit 111 is fixed by heating with the fixing device 114.

The face-down discharge unit 115 (hereinafter referred to as FD discharge unit) discharges the recording material P while the image surface of the recording material P faces downward, when the image is formed on one side of the recording material P. After the recording, the face-down discharge tray 116 (hereinafter referred to as FD discharge tray) loads the recording material P while the image surface of the discharged recording material P faces downward. After the recording, the face-up discharge unit 117 (hereinafter referred to as FD discharge unit) discharges the recording material P while the image surface of the recording material P faces upward.

The image recording unit main body 100 having the above-described configuration performs the paper feed, the image formation, and the discharge of the recording material P by conveying the recording material P in the depth direction (direction of an arrow E) of the apparatus. The recording material is conveyed so that the lengthwise direction of the recording material having the conveyable maximum size becomes the direction of the arrow E. As shown in FIG. 4, the embodiment has the configuration in which the lengthwise direction of the original having the maximum size becomes the direction of the arrow C when the original having the readable maximum size is loaded on the original plate glass. Thus, the embodiment has the configuration in which the lengthwise direction of the recording material having the conveyable maximum size is orthogonal to the lengthwise direction of the loaded original having the readable maximum size. Further, in the reading scan of the original, the embodiment has the configuration in which the conveying direction of the recording medium becomes the depth direction (direction of the arrow E) of the image recording unit main body 100 relative to the width direction (direction of the arrow C) of the image recording unit main body 100 and the scanning direction of the original (direction of the arrow C) is orthogonal to the conveying direction (direction of the arrow E) of the recording material.

The operation unit 105 includes a display unit and input keys for inputting the number of image forming sheets, an image forming signal, and the like. The operation unit 105 is provided in the front face of the apparatus to realize the good operability, so that a user can operate the apparatus from the front face of the apparatus. A key switch and an LCD display unit are provided in an electric board 105a of the operation unit 105. As can be seen from the drawings, the operation unit 105 is arranged along the lengthwise direction of the original when the original having the readable maximum size is loaded.

The electric equipment unit 120 is an example of the electric board unit. The electric equipment unit 120 includes a power supply board 120a, an image processing/communication electric board 120c, and a printer board 120b. The electric equipment unit 120 is provided in the side face of the image recording unit main body 100. The image processing/communication electric board 120c is the board which controls the original conveying unit 103 and the flat-bed scanner 101, performs the image processing, and conducts the communication in which the image is transmitted to the later-mentioned recording control board. The printer board 120b is the board which expands the printer function.

As shown in FIG. 3, the electric equipment unit 120 is provided in the same side face as the image processing/communication electric board 120c and in the side face of the recording unit 104. The electric equipment unit 120 is arranged in the lower surface of the flat-bed scanner 101.

Then, the detail and action of the image forming apparatus will be described.

(Flat-bed Scanner)

The original plate glass 101a of the original loading member on which the original is loaded, the contact type of image sensor 101b, original abutting unit 10c, a white background 101d, and a reading scan motor 101e are provided in the flat-bed scanner 101. The original abutting unit 101c becomes an abutting reference when the user sets the original on the original plate glass 101a. The white background 101d is provided in the lower portion of the original abutting unit 101c to become a white reference in reading the original. The contact type of image sensor 101b is on standby at a standby position D below the white background 101d, and the contact type of image sensor 101b performs electrical correction by reading the white background 101d before-reading the original. The reading scan motor 101e drives the contact type of image sensor 101b in the scanning direction (direction of the arrow C) of the original.

In the platen board 102, a rotation center (hereinafter referred to as hinge) is provided at the back of the apparatus. The platen board 102 is formed so as to be opened upward by a predetermined angle. The user opens the platen board 102 to load the original on the surface of the original plate glass 101a.

The action in reading the original B loaded on the surface of the original plate glass 101a will be described below. The contact type of image sensor 101b is on standby at the standby position D. In reading the original B, the white background 101d is first read to perform the correction of the electrical white reference. Then, the original B is read while the contact type of image sensor 101b scans the original B at the immediately below the original B toward the right direction of the apparatus. When the contact type of image sensor 101b reaches the right end portion of the original B, the reading is ended and the contact type of image sensor 101b is moved toward the left direction. The contact type of image sensor 101b is stopped at the standby position D to become on standby again, and the reading action is finished.

(Original Conveying Unit)

The direction of the arrow F of FIG. 3 indicates the conveying direction of the original during the reading in the original conveying unit 103. The original conveying unit 103 separates the original S loaded on the original loading tray 103a one by one to deliver the original S to the sheet reading unit 103c. As described above, after the contact type of image sensor 101b reads the white background 110d to perform the correction of the electrical white reference, the contact type of image sensor 101b is moved to the sheet reading unit 103c (original reading position) and becomes standing still. While the original is conveyed onto the original plate glass 101a by a conveying roller (not shown), the contact type of image sensor 101b reads the original. After the contact type of image sensor 101b reads the original, the original is farther conveyed and discharged on the original discharge tray 103b to be stacked.

In the invention, as shown in FIG. 3, the standby position of the contact type of image sensor 101b is located out of the recording unit 104, and the position (original reading position) of the sheet reading unit 103c which is of the stop position of the contact type of image sensor 101b during the reading in the original conveying unit 103 is located out of the recording unit 104. Therefore, even if the heat generated from the fixing device 114 of the recording unit 104 or the FD discharged recording material is transferred upward, a temperature never rises in the contact type of image sensor 101b.

The electric components, such as the reading scan motor 101e and a sensor for sensing the position of the contact type of image sensor 101b the electric components, are also arranged out of the recording unit 104. The electric components, such as the reading scan motor 101e and the sensor, are provided inside the flat-bed scanner 101. Therefore, even if the heat generated from the fixing device 114 of the recording unit 104 or the FD discharged recording material is transferred upward, the temperature never rises in the electric components.

The numeral 103d represents a reading motor which is provided in the original conveying unit 103 and conveys the original. Generally a stepping motor or a DC motor is used as the reading motor (the stepping motor is used in the embodiment). The electric components such as a sensor for sensing an edge of the original and a solenoid for putting a stamp of transmitted on the original are provided in the original conveying unit 103.

(Recording Unit)

Then, the detail configuration and action of the recording unit will be described.

The direction of an arrow G indicates the conveying direction of the recording material P. The recording unit 104 is arranged in the lower portion of the apparatus. The cassette paper feed unit 112 is arranged in a bottom portion of the recording unit 104 as a paper feed inlet of the recording material. The sheet material P stacked on the paper feed cassette 112b is conveyed by the paper feed roller 112a while separated one by one, and the sheet material P is further conveyed to be delivered to the image forming unit 111.

The setting of the recording material or a process for cleaning paper jam can be performed in front of the apparatus by drawing the paper feed cassette 112b frontward (direction of an arrow A).

The multi-paper feed unit 113 is arranged in the front face of the apparatus. The sheet material P stacked on the multi-tray 113b is conveyed by the multi-separation unit 113a while separated one by one, and the sheet material P is delivered to the image forming unit 111. The setting of the recording material into the multi-tray 113b is configured to be able to be performed from the front direction of the apparatus (direction of the arrow A).

The recording material P delivered to the image forming unit 111 from the cassette paper feed unit 112 or the multi-paper feed unit 113 is conveyed between the transfer roller 111b and the photosensitive drum 111c.

In the recording unit 104, image light is emitted from the laser scanner 110 on the basis of the image signal output from a recording control board 119, the photosensitive drum 111c of the image forming unit 111 is irradiated with the image light to form an electrostatic latent image on the surface of the photosensitive drum 111c, and the electrostatic latent image is converted into a toner image by the development unit 111d, and the toner image is transferred to the recording material P fed from the cassette paper feed unit 112 to the image forming unit 111.

The photosensitive drum 111c, the charging means, the developing means, and the cleaning means are integrally incorporated into the toner cartridge 111a. The photosensitive drum 111c is formed so as to be detachable from the image recording unit main body 100. A cover 118 (hereinafter referred to as cartridge cover) which the user can open and close is provided in the upper portion of the image forming unit 111. When the user exchanges the toner cartridges, or when the jam of the recording material is generated in the image forming unit 111, the toner cartridge 111a can be detached by opening the cartridge 118 from the front surface of the apparatus.

The transfer roller 111b is arranged in the lower portion of the photosensitive drum 111c of the image forming unit 111, and the fixing device 114 is arranged on the downstream side of the photosensitive drum 111c in the conveying path.

After the toner image formed on the surface of the photosensitive drum 111c is transferred to the recording material P by the transfer roller 111b, the recording material P is conveyed along the recording conveying unit, and the toner image is fixed by the fixing device 114. After the fixing, the recording material P is further conveyed and discharge to the outside of the apparatus by the FD discharge unit 115 to be stacked on the FD discharge tray 116.

The stacking position is provided so that the user can take out the recording material from the front side of the apparatus.

As described above, the operations such as the insertion of the original, the taking out of the recording material, the drawing of the recording material cassette, the setting of the recording material into the multi-paper feed unit, the tang out of the toner cartridge, and the operation of the operation unit can be performed from the front direction of the apparatus (direction of the arrow A) and the good operability can be realized.

The face-up discharge unit 117 (hereinafter referred to as FU discharge unit) is provided in the backside of the apparatus. The FU discharge unit 117 discharges the recording material P while the image surface of the recording material P faces upward. The FU discharge unit 117 can change the conveying path on the downstream side of the fixing device 114 by opening a cover (hereinafter referred to as FU tray) 117a1 which is also used as the tray to a position 117a2, and the recording material is discharged and stacked on the FU tray 117a2.

The conveying path between the fixing device 114 and the FU discharge unit 115 is opened by opening the FU tray 117a1 to the position 117a2, and the recording material P can be removed when the jam of the recording material P occurs.

(Description of Layout of Electric Board)

Then, the layout of the electric board which is of the feature of the invention will be described.

The power supply board 120a, the printer board 120b, and the image processing/communication electric board 120c are provided in the electric equipment unit 120. The power supply unit 120a and the electric board are surrounded by a shield box 120h. The shield box 120h is formed by sheet metal having a box shape. The shield box 120h decreases noise radiated from the electric board and strengthens the ground of the board by surrounding the electric board.

The shield box 120h is a rigid body which connects the flat-bed scanner 110 and the image recording unit main body 100. The shield box 120h also has the function of supporting the flat-bed scanner 110. The power supply unit 120a is arranged at the back of the left side face of the apparatus while the board is vertically set.

The printer board 120b is arranged in front of the left side face of the apparatus while the board is vertically set. An external interface connector 120d1 (hereinafter referred to as Centronics connector) is provided in the backside of the printer board 120b. When the Centronics connector 120d1 is used, a Centronics cable 120d2 for connecting an external device is connected to the Centronics connector 120d1.

The image processing/communication electric board 120c is arranged in front of the left side face of the apparatus while the board is vertically set. The image processing/communication electric board 120c controls communication of the facsimile. A modular connector 120e1 for connection to a telephone line is exposed from the apparatus at the back of the apparatus. When the modular connector 120c1 is used, a modular cable 120e2 for connection to the telephone line is connected to the modular connector 120e1.

In this case, the Centronics connector 120d1, the Centronics cable 120d2, modular connector 120e1, and the modular cable 120e2 are projected from the image processing/communication electric board 120c toward the backside of the apparatus. However, the printer board 120b and the image processing/communication electric board 120c are arranged in front of the backside of the apparatus, so that the Centronics connector 120d1, the Centronics cable 120d2, modular connector 120e1, and the modular cable 120e2 are never projected from the backside of the apparatus.

The image processing/communication electric board 120c also performs the image processing by controlling the flat-bed scanner 101 and the original conveying unit 103. The printer board 120b is one which connects the image processing/communication electric board 120c and the electric components in the original conveying unit 103 and the flat-bed scanner 101.

The electric components in the original conveying unit 103 include the reading motor 103d, the sensor for sensing the edge of the original, the paper feed solenoid, and the solenoid for putting the stamp of transmitted on the original. The electric components in the flat-bed scanner 101 include the contact type of image sensor 101d and the reading scan motor 101e. Since the electric components in the original conveying unit 103 and the flat-bed scanner 101 are located in the upper portion of the electric equipment unit 120, a reading cable 102b for connecting the image processing/communication electric board 120c and the electric components can be connected with the shortest length.

The image processing/communication electric board 120c and the operation unit electric board 105a are arranged close to each other. The image processing/communication electric board 120c also controls the operation unit electric board 105a provided in the operation unit 105. The image processing/communication electric board 120c and the operation unit electric board 105a are connected with a signal line (hereinafter referred to as operation unit cable 120g) for controlling the board of the operation unit 105.

As described above, the reading cable 120b which connects the electric components in the original conveying unit 103 and the flat-bed scanner 101 and the processing/communication electric board 120c and the operation unit cable 120g which connects the operation unit electric board 105a of the operation unit 105 and the processing/communication electric board 120c can be made with the shortest length to decrease the radiation noise and the electrostatic noise by arranging the processing/communication electric board 120c near the original conveying unit 103, the flat-bed scanner 101, and the operation unit 105. Therefore, cost-up caused by the use of a noise killer component or the like can be prevented.

The processing/communication electric board 120c is also connected to the recording control board 119 for controlling the image forming means. As described above, the image formation is performed by transmitting the image from the processing/communication electric board 120c to the recording control board 119. Because the recording control board 119 is located in the backside portion of the processing/communication electric board 120c, the connection cable is made with the shortest distance. Therefore, the radiation noise and the electrostatic noise can be decreased, and the cost-up caused by the use of the noise killer component or the like can be prevented.

As shown in FIG. 4, when the recording material P is conveyed in the depth direction (direction of the arrow E) of the apparatus to perform the recording, the recording unit 104 has the configuration in which the recording material P is set into the paper feed cassette 112b so that the lengthwise direction of the recording material P becomes the depth direction (direction of the flow E) of the apparatus. At this point, since the installation size of the recording unit 104 is determined by the maximum size of the recording material, the width direction of the apparatus becomes shorter in the recording unit 104.

On the other hand, when the original is read in the width direction (direction of the arrow C) of the apparatus, the flat-bed scanner 101 has the configuration in which the original B is set onto the original plate glass 101a so that the lengthwise direction of the original B becomes the width direction (direction of the arrow C) of the apparatus. At this point, since the installation size of the flat-bed scanner 101 is substantially determined by the maximum size of the loaded original B, the flat-bed scanner 101 has the installation space in which the width direction (direction of the arrow C) of the apparatus becomes longer and the depth direction (direction of the arrow E) becomes shorter.

That is, as described above, the scanning direction in which the original B is read and the lengthwise direction of the loaded original having the maximum size become the width direction (direction of the arrow C) of the apparatus, the conveying direction of the recording material P becomes the depth direction (direction of the arrow E) of the apparatus, and the scanning direction (direction of the arrow C) in which the original B is read is orthogonal to the conveying direction (direction of the arrow E) of the recording material P. Therefore, in the width direction (lateral direction) of the apparatus, the width of the flat-bed scanner 101 is wider than that of the image recording unit main body 100 and the flat-bed scanner overhangs from the image recording unit main body 100, so that the space of the side face of the recording unit becomes the dead space (hereinafter referred to as space X). The miniaturization of the apparatus can be achieved by arranging the electric boards such as the printer board 120b and the processing/communication electric board 120c in the space X.

Not only the operations such as the setting of the original B onto the original plate glass 101a, the load of the original B onto the original loading tray 103a, the taking out of the discharged original, and the taking out of the recording material discharged after the recording, but also the operation such as the supply of the recording material to the cassette paper feed unit or the multi-tray, the drawing of the cassette in the process for removing the jam, the taking out of the toner cartridge, and the operation of the operation unit can be performed from the front direction of the apparatus and the good operability can be realized.

In the recording unit 104, since it is necessary to remove the heat of the fixing device 114, generally a louver for removing the heat is provided in the backside of the apparatus where the fixing device 114 faces the outside of the apparatus. However, in the embodiment, the board is not provided at the position which blocks the backside of the apparatus, so that the louver can be provided on the backside in order to remove the heat from the fixing device 114, and the heat can be efficiently removed. Further, the influence of the heat on the electric board can be decreased by separating the electric boards such as the printer board 120b and the processing/communication electric board 120c from the fixing device 114, and the heat sources can be dispersed as a whole.

Since the electric boards such as the printer board 120b and the processing/communication electric board 120c are concentrated in the side face, the user can approaches to the electric boards only by opening the cover. Therefore, when the user or a service person performs maintenance or expansion of the electric board, the user or the service person easily approaches to the electric board and good workability is realized. Further, the space for the electric boards can be secured in one side face of the recording unit, so that cost can be reduced by optimizing the size of the electric board.

The image processing/communication electric board 120c which controls the original conveying unit 103 and the flat-bed scanner 101 can be arranged on the same side face as the original conveying unit 103 and up to the position immediately below the flat-bed scanner 101. Therefore, the reading cable 120b for the connection can be shortened, and the radiation noise and the electrostatic noise can be decreased.

The standby position D of the contact type of image sensor 101b, the stop position during the reading in the original conveying unit 103, the arrangement of the electric components in the original conveying unit 103, and the arrangement of the electric components in the flat-bed scanner 101 can be provided immediately above the fixing device 114 which is of the heat source of the recording unit and at the position out of the discharged recording material (retracted position). Therefore, the temperature rise is decreased in the electric components including the contact type of image sensor 101b, which enables the problem such as malfunction caused by the temperature rise of the electric component and condensation of the electric component caused by the rapid increase in temperature to be solved.

The Centronics connector 120d1, the Centronics cable 120d2, modular connector 120e1, and the modular cable 120e2 are projected from the image processing/communication electric board 120c toward the backside of the apparatus in the electric equipment unit 120. However, since the electric boards 1 are arranged in front of the backside of the apparatus, so that the Centronics connector 120d1, the Centronics cable 120d2, modular connector 120e1, and the modular cable 120e2 are never projected from the backside of the apparatus. Therefore, space-saving can be achieved.

The electric boards such as the printer board 120b and the processing/communication electric board 120c can be separated from the fixing device 114 and power supply unit 120a, so that a countermeasure against the heat can be performed with economized means such that the heat sources are dispersed.

The flat-bed scanner 101 is held by the shield box 120h which shields the electric boards such as the printer board 120b and the processing/communication electric board 120c and also acts as the rigid structure. Therefore, it is not necessary to provide another structure, which allows the cost to be reduced.

In the embodiment, the electric boards such as the printer board 120b and the processing/communication electric board 120c are arranged in the left side face of the apparatus which is the same side face as the original conveying unit 103, because the original conveying unit 103 is provided on the left side of the apparatus. However, when the original conveying unit 103 is provided on the right side of the apparatus, similarly the dead space X below the flat-bed scanner 101 can be effectively used by also providing the electric boards on the right side of the apparatus. Therefore, the miniaturization of the apparatus can be achieved, the connection cables such as the reading cable 102b and the operation unit cable 120g can be made with the shortest length, and the radiation noise and the electrostatic noise can be decreased.

In the embodiment, the reading sensor is movably formed, because the contact type of image sensor 101b is used as the original reading means. However, in the case of an optical system in which the image is read by reducing the image of the original surface with a lens to focus the image on CCD, CCD is fixed. In this case, similarly to the electric components in the flat-bed scanner 101, CCD is arranged in the upper portion of the electric equipment unit 120. Therefore, the influence of the heat from the image recording unit main body 100 can be eliminated and the connection cables such as the reading cable 102b and the operation unit cable 120g can be made with the shortest length. In the case of the reducing optical system, the scanning is performed with a mirror. Similarly to the contact type of image sensor 101b, the standby position D and the reading position in the original conveying unit 103 are provided in the location out of the image recording unit main body 100. Therefore, the problem such as the condensation of the mirror caused by the rapid increase in temperature of the recording unit can be solved.

As described above, in accordance with the invention, in the configuration in which the lengthwise direction of the loaded original having the maximum size is orthogonal to the lengthwise direction of the conveyed recording material, the margin space where the recording material is not conveyed can be effectively used in the lengthwise direction of the original.

Further, the width of the image forming apparatus can be decreased in the direction orthogonal to the lengthwise direction of the loaded original having the maximum size by effectively using the margin space.

Although the embodiment of the invention is described above, the invention is not limited to the above-described embodiment, and various modifications and changes can be made without departing Boa the technical thought of the invention.

This application claims priority from Japanese Patent Application No. 2003-349735 filed Oct. 8, 2003, which is hereby incorporated by reference herein.

The invention claimed is:

1. An image forming apparatus comprising:
an image reading device having (i) an original loading member on which an original is loaded and (ii) an image reading component, which is movable in a lateral moving direction, for scanning the loaded original to read image information;
a recording material conveying component, which is disposed below the image reading device and conveys a recording material through the image forming apparatus in a direction substantially orthogonal to the lateral direction;
image forming means for forming an image on the recording material during the conveyance of the recording material; and
an electrical board, which is arranged in a space below the image reading device and adjacent to the recording material conveying component in the lateral direction, for controlling operation of the image forming apparatus,
wherein (i) a length of the original loading member in the lateral direction is greater than a width of the original loading member and (ii) a length of the image reading device in the lateral direction is greater than a width of the image reading device.

2. The image forming apparatus according to claim 1, wherein the recording material, having a maximum size, is conveyed in a way such that a width of the recording material in the lateral direction is less than a length of the recording material.

3. The image forming apparatus according to claim 1, wherein the electrical board is disposed along a side face of the image forming apparatus.

4. The image forming apparatus according to claim 1, further comprising an original conveying component for conveying the original, wherein the original conveying component and the electrical board are arranged on the same side of the image forming apparatus.

5. The image forming apparatus according to claim 1, wherein the electrical board is shielded by a metal shield box.

* * * * *